Dec. 19, 1967 P. H. TROUTMAN 3,359,501
AUTOMATIC GAIN CONTROL IN A MAGNETIC AMPLIFIER
Filed Feb. 12, 1964
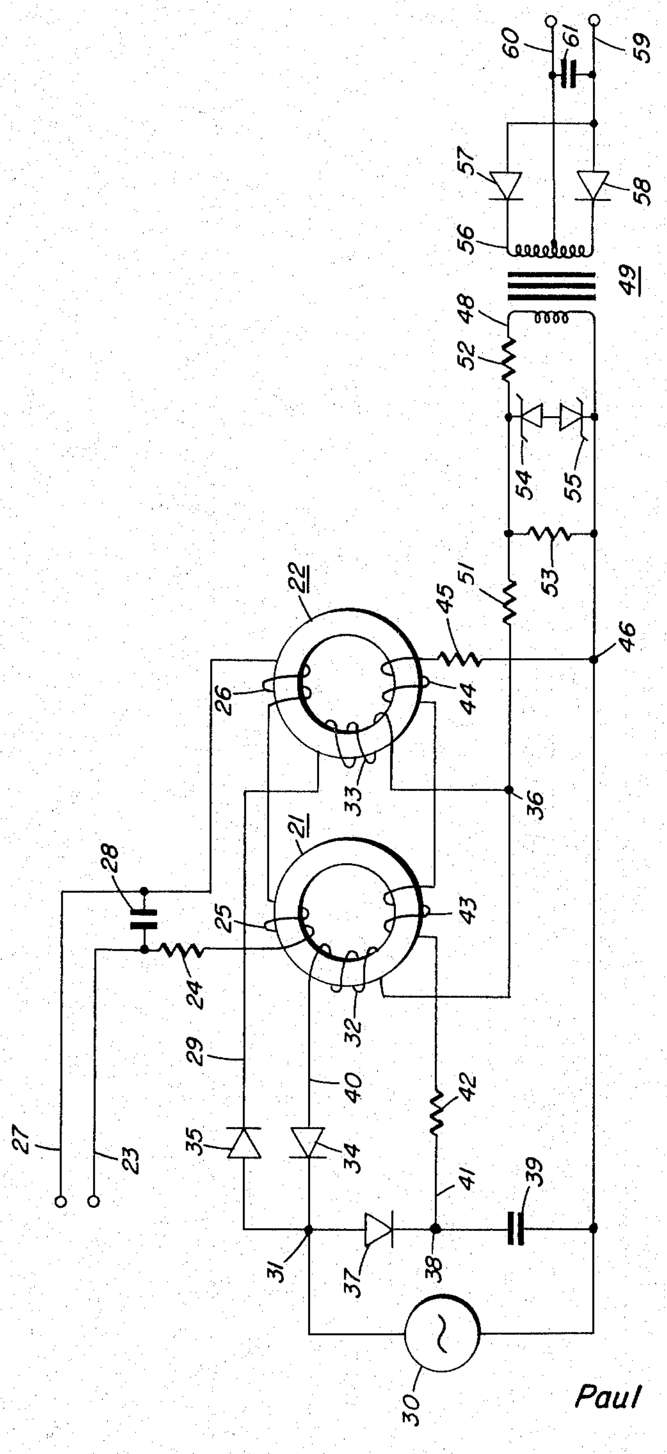
INVENTOR
Paul H. Troutman
BY Claude Funkhouser
ATTORNEY United States Patent Office 3,359,501 Patented Dec. 19, 1967

3,359,501
AUTOMATIC GAIN CONTROL IN A MAGNETIC AMPLIFIER

Paul H. Troutman, Schenectady, N.Y., assignor, by mesne assignments, to the United States of America as represented by the Secretary of the Navy Filed Feb. 12, 1964, Ser. No. 344,514
1 Claim. (Cl. 330—8)

ABSTRACT OF THE DISCLOSURE

An automatic gain control circuit for maintaining the operation of a utilization device constant regardless of drastic and rapid changes of input signal to the device. A sample of the input voltage, and a desired control voltage, are applied through coils to a rectangular hysteresis magnetic amplifier where the two voltages are compared and difference signal produced. This difference signal is then used to offset any variation in the input signal.

The present invention relates to an automatic gain control circuit and more specifically to such a circuit employing a magnetic amplifier therein.

In operation of precision control equipment, it is often required that power levels be kept within certain limits. Circuit elements such as precision relays, photomultipliers and the like require a minimum power for operation; yet, power exceeding a maximum level may harm the precision element. For example, the operating range of a photomultiplier tube is such that signals of too great a power level will cause saturation of the tube, which in turn causes rapid attenuation of the signal; whereas, power levels must be maintained high enough above a minimum level to operate an ultra-sensitive relay which indicates the presence of a light beam.

The circuit of the present invention provides signals to a precision control device such as the photomultiplier tube mentioned hereinabove, which maintains operation of the device within its operating levels despite drastic and rapid changes in the control signals applied thereto. By feeding back a portion of the output signal of the control device, comparing this signal with a signal of desired value in the circuitry of the present device, and using the resultant signal of the comparison as a bias or control voltage to the control device a nearly constant output signal is maintained, thereby eliminating the problems mentioned hereinbefore. The AGC circuit of the present invention utilizes a novel arrangement of rectangular hystereses loop magnetic amplifier or saturable reactor circuitry, and a transformer stage coupled thereto to provide the desired bias signal to the precision device.

An object of the present invention is the provision of an automatic gain control circuit which maintains a precision element operative within a precise range of values.

Another object of the present invention is the provision of an automatic gain control circuit which maintains a bias signal to a precision control device, such that the control device is maintained in its operating range despite drastic changes of input signal thereto.

Other objects and features of the invention will become apparent as the disclosure is made in the following detailed description of an embodiment of the invention as illustrated in the accompanying single figure of drawing in combination with the appended claim in which:

The sole figure of drawing illustrates the circuitry employed in an embodiment of the present invention.

Referring now to the drawing, there is shown substantially rectangular hystereses loop magnetic amplifier cores 21 and 22 to which the input signal is applied via lead 23, resistor 24, coil 25 wound about core 21, coil 26 wound about core 22 and returning on lead 27. Coils 25 and 26 are wound in additive relationship about the core while a capacitor 28 is in parallel circuit relationship between leads 23 and 27.

A gating or power signal to cores 21 and 22 is applied from a suitable alternating current generator 30 over leads 40 and 29 which originate at junctions 31, tied to one side of the generator 30. Between junction 31 and the coils 32 and 33, which are wound in opposing relationship on cores 21 and 22, respectively, are located diodes 34 and 35, in series and of opposite polarity one to the other in the circuit. The other ends of coils 32 and 33 are tied together at junction 36. Coil 32 is wound to oppose the flux created by coil 25 on core 21; and coil 33 is wound to aid the flux created by coil 26 on core 22.

The anode of diode 37 also branches from junction 31, while the cathode of diode 37 is tied to a junction 38 which is formed by a lead from one end of capacitor 39 and lead 41. The lead 41 supplies a path for a bias to saturable reactors 21 and 22 through resistor 42, and coils 43 and 44 are wound in series on cores 21 and 22, respectively, and in the same sense as coils 25, 26, and 33 but in opposite sense to coil 32. The bias signal returns from coil 44 via resistor 45 and junction 46 which is tied to the other end of capacitor 39 and the other side of generator 30.

The signal from junction 36 is applied to one side of primary winding 48 of iron core step-up transformer 49 through series resistors 51 and 52, the other side of the primary winding 48 is tied to the junction 46. Connected between resistors 51 and 52 is a parallel combination of re sistor 53 and back to back Zener diodes 54 and 55, the other leads of which are also returned to junction 46.

The secondary winding 56 of transformer 49 is center-tapped. In series with the two other leads are the cathodes of diodes 57 and 58, the anodes of which are tied together forming one output lead 59 of the device. The other output lead 60 is connected to the center-tap of the winding 56. A capacitor 61 appears in parallel across leads 59 and 60.

In operation, the current from generator 30 is rectified by diode 37, filtered by capacitor 39 and flows through coils 43 and 44 as a DC current which provides a suitable bias for cores 21 and 22. Resistors 42 and 45 serve to set the level of this bias signal and thereby determine the operating value of the cores 21 and 22.

The control signal feed back over leads 23 and 27 from the output of a precision element (not shown) produces flux in the cores by passing through windings 25 and 26 where this flux is compared to the flux created by the bias current, and applied in such a manner to the cores that the bias flux and control flux subtract. Capacitor 28 serves to filter any of the AC signal that may be induced in the control windings 25 and 26 and resistor 24 is used to increase the resistance of the windings. Thus, if a difference signal is produced as result of the comparison, a portion of the power or gate signal produced by generator 30, rectified by diodes 34 and 35, is allowed to pass through the windings 32 and 33, which signal is in inverse proportion to the difference signal. Resistors 51, 52 and 53 and Zener diodes 54 and 55 limit any transient output and load of the saturable reactors. The iron core transformer serves to step-up and invert the voltage of the signal applied to primary 48. Diodes 57 and 58 serve as high voltage rectifiers and capacitor 61 filters any further AC that might appear across the output winding 56. The voltage across terminals 59 and 60 is applied as a control to the precision element from which control signals are fed to input leads 23 and 27 thereby maintaining the precision element operating within precise limits.

Thus, an automatic gain control has been fully disclosed which serves to maintain a precision control device within operating levels, notwithstanding wide and rapid variations in the input signal applied to the control device.

Obviously many modifications and variations of the present invention are possible in the light of the above teachings. It is therefore to be understood that within the scope of the appended claims the invention may be practiced otherwise than as specifically described.

What is claimed is:

An automatic gain control circuit comprising:
- a magnetic amplifier having a first magnetic core and a second magnetic core;
- an alternating current source;
- a load;
- means for applying a bias signal to said magnetic amplifier comprising:
  - a first bias winding on said first magnetic core, and
  - a second bias winding on said second magnetic core wound in the same flux sense as said first bias winding and in series therewith;
- means for applying a power signal to said magnetic amplifier comprising:
  - a first power winding on said first core, and
  - a second power winding on said second core wound in opposite sense to said first power winding;
- means for applying a control signal to said magnetic amplifier comprising:
  - a first control winding on said first core wound in the same flux sense as said first and second bias windings, and
  - a second control winding on said second core in series with and wound in the same flux sense as said first control winding;
  - whereby a difference signal is produced; and
- means for applying a signal to said power windings that is inversely proportional to said difference signal comprising:
  - a first diode having an anode and a cathode, said anode being connected to one side of said first power winding and said cathode being connected to one side of said alternating current source,
  - a second diode having an anode and cathode, said anode being connected to the same side of said alternating current source and said cathode being connected to one side of said second power winding, and
  - circuit means connecting said other sides of said first and second power windings and said load in series with the other of said alternating current source.

References Cited

UNITED STATES PATENTS

| | | | |
|---|---|---|---|
| 2,892,155 | 6/1959 | Radus et al. | 330—8 X |
| 3,137,823 | 6/1964 | Cioccio et al. | 330—8 |

ROY LAKE, *Primary Examiner.*

NATHAN KAUFMAN, *Examiner.*